United States Patent [19]
Krist et al.

[11] Patent Number: 5,745,883
[45] Date of Patent: Apr. 28, 1998

[54] BILLING SYSTEM FOR USE WITH DOCUMENT PROCESSING SYSTEM

[75] Inventors: Peter M. Krist, Rochester; Atashi C. Sonty, Pittsford, both of N.Y.

[73] Assignee: Xerox Corporation, Stamford, Conn.

[21] Appl. No.: 657,716

[22] Filed: May 30, 1996

[51] Int. Cl.$^6$ ..................................................... G03G 21/02
[52] U.S. Cl. ............................................. 705/34; 705/30
[58] Field of Search .................................. 705/1, 28, 29, 705/30, 34, 40; 399/79; 364/464.01; 235/375, 378

[56] References Cited

U.S. PATENT DOCUMENTS

| | | | |
|---|---|---|---|
| 5,117,258 | 5/1992 | Iwata | 355/201 |
| 5,146,344 | 9/1992 | Bennett et al. | 358/296 |
| 5,300,761 | 4/1994 | Kasahara et al. | 399/79 |
| 5,383,129 | 1/1995 | Farrell | 364/464.01 |
| 5,659,845 | 8/1997 | Kris et al. | 235/375 |

Primary Examiner—Kevin J. Teska
Assistant Examiner—Dan Fiul
Attorney, Agent, or Firm—Gary B. Cohen

[57] ABSTRACT

A billing system for use in a printing system which processes a job with one or more events occurring, relative to the job, as a result of processing the job, is provided. The billing system includes a configurable billing information file including a plurality of current incrementable billing meters with each current incrementable billing meter corresponding with a set of one or more attribute values, and an information set including event related information with the event related information indicating that a new incrementable billing meter is to be added to the plurality of current incrementable billing meters or that one of the plurality of current incrementable billing meters is to be deleted. The billing system further includes a billing meter manager, responsive to the information set, for causing the new incrementable billing meter to be added to the configurable billing information file or for causing one of the plurality of current incrementable billing meters to be deleted from the configurable billing information file.

20 Claims, 5 Drawing Sheets

BILLING SYSTEM FOR USE WITH DOCUMENT PROCESSING SYSTEM

BACKGROUND AND MATERIAL DISCLOSURE STATEMENT

This invention relates generally to a billing system for a document services architecture and, more particularly, to a billing system with a configurable billing meter file, having a plurality of billing meters, in which a user can, without recompiling code for the architecture, add a billing meter to the plurality of billing meters or delete one of the plurality of billing meters.

Electronic reprographic machines or electronic printing systems may possess a wide range of system functions, including binding, scanning, stapling, stitching, shrink wrapping, etc. A print shop may use an electronic reprographic machine with robust functionality to meet the needs of customers who seek copies of "short run" jobs. Even though short run jobs may not require the setting of a master, they still may utilize a large range of functions and materials (e.g. paper and toner). Maintaining records of those functions employed and materials used is a simple matter for electronic reprographic machines with digital capability and mass memory, e.g. a disk storage device.

In one example, a record of the materials used for each short run job (hereinafter referred to simply as "job") is maintained in a dedicated account for a customer. In one conventional approach, such as that disclosed in U.S. Pat. No. 5,117,258 to Iwata (Issued: May 26, 1992), each customer is mapped to a given paper type set with a plurality of paper types. Additionally, each paper type in the set is provided with a fixed rate. As the job for a given customer is executed, the number of sheets used for each paper type is counted and the number of sheets used for each paper type is tabulated. The tabulated sums are then multipled with their respective rates so that a billable amount for the paper types used can be determined. The billable amounts are then summed to provide a total cost for paper used.

The approach of Iwata appears to be inefficient, with respect to memory usage because, as shown in FIG. 10 of Iwata, the set of paper types is set uniformly for each customer. It will be appreciated that the needs of the customers changes over time and the demand of even a single customer may vary over time. This apparent problem of setting uniform account size for each customer appears to be solved by U.S. Pat. No. 5,146,344 to Bennett (Issued: Sep. 8, 1992) in which a machine administrator can create a new account and specify a subset of system functions, from a set of system functions, to be used in the new account. In particular, it is believed that the set of system functions is "hard-coded" into the associated electronic reprographic machine in the form of a predesignated set of billing meters and the system administrator can specify which of the billing meters in the hard-coded set are to be used in setting up the new account.

While this approach disclosed by Bennett is certainly more flexible than the approach provided by Iwata, the Bennett approach is not believed to provide a maximum degree of flexibility in either accommodating for new billing meters or providing for the deletion of preexisting billing meters. That is, for the situation in which billing meters are hard-coded in the host electronic reprographic machine, it is impossible to add or subtract from the meter set without writing code for the machine operating system and recompiling the operating system in order to implement such new code. It would be desirable to allow for a situation in which a user can freely add a new billable meter to or subtract a billable meter from the billable meter set without recompiling the operating system of the reprographic machine.

Additionally, the account setup disclosed by Bennett is believed to be inflexible in that an account is set up in terms of customers. In particular, a customer may wish to use the host electronic reprographic machine to print multiple jobs over time. In one example, a first print set of a job may be executed on one day and a second print set of a job may be executed on a second day. Moreover, the user may wish to be billed separately for each of the first and second jobs. The accounting system of Bennett does not appear to provide the flexibility to maintain a separateness between the first and second jobs in a single account. This is because accounting is performed on a customer rather than a job basis. It would be desirable to provide an accounting system that maintains a record of each instance of a job's printing so that a detailed record of the job, with respect to functions performed on the job and materials employed in printing the job can be maintained over an extended period.

SUMMARY OF THE INVENTION

In accordance with the present invention, there is provided a billing system for a printing system which processes a job. One or more events occur, relative to the job, as a result of processing the job. The billing system generates billing information by reference to the events and comprises: a configurable billing information file including a plurality of current incremental billing meters with each current incrementable billing meter being defined by a set of one or more attribute values; an information set including event related information with the event related information indicating that a new incrementable billing meter is to be added to the plurality of current incrementable billing meters or that one of the plurality of current incrementable billing meters is to be deleted; and a billing meter manager, responsive to said information set, for causing the new incrementable billing meter to be added to said configurable billing information file or for causing one of the plurality of current incrementable billing meters to be deleted from said configurable billing information file.

DESCRIPTION OF PREFERRED EMBODIMENTS

While the present invention will hereinafter be described in connection with a preferred embodiment thereof, it will be understood that it is not intended to limit the invention to that embodiment. On the contrary, it is intended to cover all alternatives, modifications and equivalents as may be included within the spirit and scope of the invention as defined by the appended claims.

Figure 6:
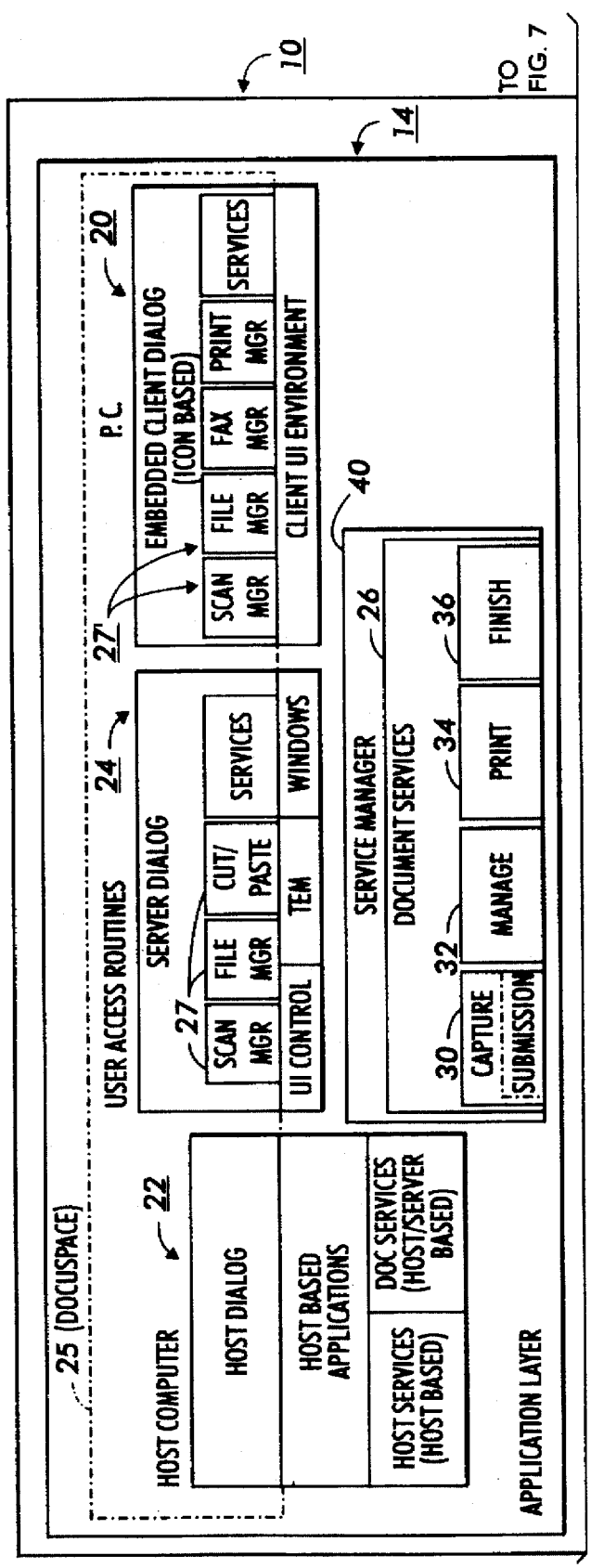
FIGS. 6 and 7 represent a schematic block diagram of the document services architecture in which subsystems associated with various layers are shown.
Figure 7:
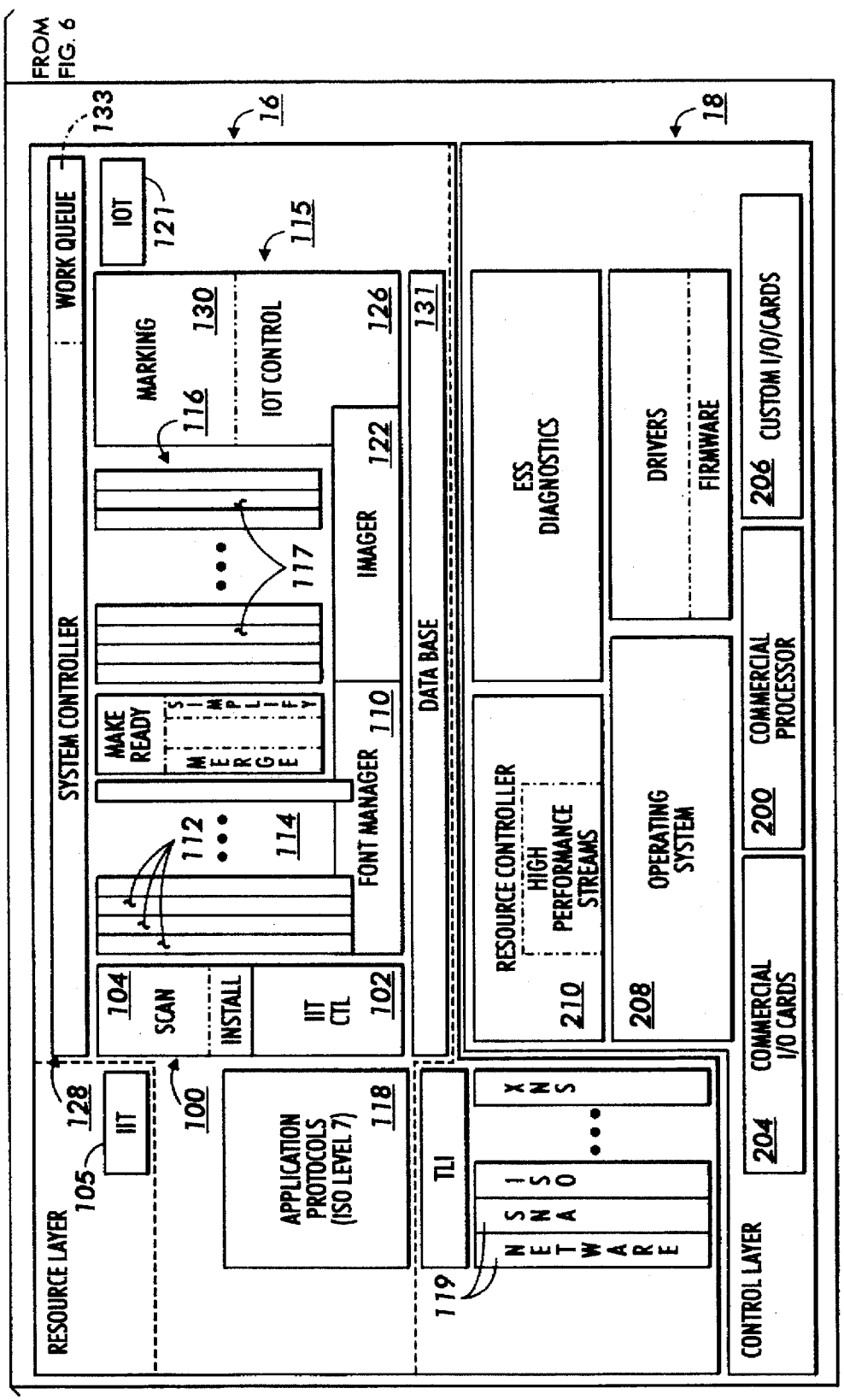

Referring generally to FIGS. 6 and 7 of the drawings, there is shown the document services architecture 10 of the present invention. Document services architecture 10 is a layered architecture in which the functions performed are grouped into vertically ordered strati, referred to herein as layers.

Document services architecture 10 has three principal layers; namely, an applications layer 14, a resource layer 16, and a control layer 18. Referring specifically to FIG. 6, applications layer 14 enables access to a defined set of document services from either a remote workstation such as a Personal Computer (PC) 20 or host computer 22, or user access routines (Dialog) 24 resident with the architecture 10. Layer 14 has a document services section 26 which cooperates with the modules and facilities of resource layer 16 to provide the document services offered by the architecture. Document services section 26 includes capture service 30, management service 32, printing service 34, and finishing service 36. Layer 14 additionally incorporates an overriding service manager 40 that coordinates and controls access to and collaboration between the individual document services provided by service section 26.

Resident user access routines Server (Dialog) 24 provide for interaction with the document services 26 through a defined set of UI descriptions 27 and operation paradigms (services). These UI descriptions 27 include scan manager, file manager, print manager, make ready selections such as cut and paste, and other services as described more fully in U.S. Pat. No. 5,493,634 to Bonk et al., the disclosure of which is incorporated herein by reference. Remote workstations such as PC 20 would also enable access to the aforementioned services via similar UI descriptions 27' when programming work input. This set of UI descriptions and paradigms provide a consistent and spatially independent document management programming and usage model document environment (DocuSpace) 25 that is supported by the rest of the architecture.

Resource layer 16 performs the work described to it by document services section 26 of applications layer 14, and for this purpose has a collected set of software modules and facilities which are capable of being reused, combined, and distributed to provide a variety of services and products.

Resource layer 16 (FIG. 7) consists of three principal sections: a system controller 128; facilities 100, 116, 119 sequenced by the system controller to carry out the document services called for (i.e., capture 30, management 32, printing 34, finishing 36); and a data base 131 shared by the facilities. Database 131 contains the shared information upon which facilities rely. Further details regarding the structure and operation of a system state controller, suitable for use in with the preferred embodiment is provided in U.S. Pat. No. 5,170,340 to Prokop et al., the disclosure of which patent is incorporated herein by reference.

For capture service 30 of application layer 14 (FIG. 6), the facilities in resource layer 16 (FIG. 7) comprise an image input facility 100, data stream section 116, and application protocols 118. Image input facility has IIT controller 102 and Scan manager 104. IIT controller 102 is to control an attached or remote document scanner 105, and scan manager 104 to capture work in the form of raster (bitmap) image descriptions or documents, or operating instructions in the form of job programming. A data stream section 116 provides various Page Description Language (PDL) and data stream interpreters 117 for a selection of PDL and data stream such as Postcript TM, Interpress, Laser Conditioned Data Stream (LCDS), Xerox TM Encoding Sequence (XES TM), etc. that are available from the input source data description such as coming from PC 20 or host computer 22. The data stream section 116 captures work in the form of electronic documents, which, in turn, are logical sequences of page descriptions and associated structure information, or operating instructions, in the form of printing instructions and/or finishing instructions.

Application protocols 118 are standard communication applications appropriate to a document service such as printing, filing, network, name dereferencing, etc. that are available in a variety of communication suites such as Xerox TM Network Services (XNS TM), International Standards Organization (ISO), etc. The transport protocol stacks 119 have protocol layers 1–6 that represent basic mechanisms for moving data between computing or communicating systems for the variety of communication suites. The architecture provides for a logical separation and automated binding between the Application protocols 118 of resource layer 16 and transport protocol 119 stacks of control layer 18. This allows arbitrary routing and mix and match of the applications to the transport stacks for the various communication suites.

For printing services 34 of application layer 14, the facilities provided in layer 16 comprise a font selection library 112, make ready section 114, and imager section 122. Font selection library 112 provides interpreters for various font formats such as FIS, Type I, F3, etc., and a font manager 110 that allows fonts in any format to be used interchangeably. Make ready section 114 supports pre-press and system xerographic operations and provides various service selections and options such as signatures, merge, cut and paste, etc., as noted in the aforecited Holt application.

Imager section 122 performs the necessary manipulation of image or page descriptions obtained via the capture service 30 of layer 14, combining the page descriptions with the data obtained from the font manager 110 or the environment (database) 131 to produce the final form data suitable for use by the Make ready section 114, or suitable for use by Image Output facility 115, or suitable for transmittal to and use directly by an Image Output Terminal (IOT) 121, or suitable for exporting to another system. Having a single shared Imager section 122 that is logically separate from the data stream section 116 allows for consistent imaging across the PDL and data stream interpreters 117, across various Image Output Terminals (IOT) 121 and between systems. A single shared imager 122 also facilitates integration of new interpreters 117 and allows for intermix of PDL and data streams within a document (compound document).

For finishing service 36, the image output facility 115 consists of the IOT controller 126 and marker 130. The former is for controlling the attached or remote Image Output Terminal (IOT) 121, the latter for producing the prints (documents) programmed.

The Image Output Terminal (IOT) 121 may be any suitable marking device such as a laser printer, ink jet printer, etc. The IOT 121 may also include finishing facilities such as sorting, stapling, binding, signatures, etc., which are also accessed/managed by the Image Output facility 115, on behalf of the finishing service 36 of document services section 26.

For management service 32 of application layer 14, the facilities in the resource layer 16 comprise the system controller 128, applications protocols 118, and font manger 110. System controller 128 provides access to and management of most system resources and database objects directly, while application protocols 118 provides remote access to the management service from either a PC 20 or host computer 22 via standard protocol mechanisms. Font manager 110 provide access to and management of the systems fonts.

Control layer 18 provides a virtual machine for server platforms as described in the above-mentioned Prokop patent, using standard commercial processor platforms 200 and standard and/or custom I/O cards 204, 206 for processing options. An industry standard operating system 208 such as UNIX is used with special custom supplied extensions to enable real time and multiprocessing. Resource controller 210 of layer 18 coordinates bandwidth and resource access between the independent facilities.

System controller 128 of resource layer 16 coordinates operation of the facilities in resource layer 16 to accomplish the service called for, to enable concurrent operation, and to manage the productivity of the system through scheduling of the various facilities in layer 16 in cooperation with a resource controller 210 in control layer 18. Controller 128 controls facility resource management, job management, and the sequencing of job steps, the latter by scheduling the job steps in the work queues 133 of layer 16 associated with the particular facility used.

In the case where an operator decides to scan and print a document, system controller 128 creates a new job as described to it by applications layer 14 mediating with the operator via a remote workstation such as PC 20 or host computer 22, or through user access routines (Dialogs) 24. System controller 128 creates a plan for the job, specifying the various facility sequencing required to carry out the job. A set of priorities for the resources such as I/O bandwidth, physical memory, etc. is planned. To execute the plan, system controller 128 places work requests, representing the job steps, in the work queues 133 of the facilities required to perform the job. When a facility becomes idle, the facility accesses the work queue for that facility and selects the next work request to execute. If necessary due to priorities, control layer 18 redistributes the resources.

System controller 128 formulates a plan for each job similar to an assembly line. In executing the plan, controller 128 places the work requests in the appropriate work queues 133 for the facilities that will perform the work. Each facility draws the work requests from the work queue of the facility, accesses the appropriate database 131, and performs the appropriate operations. When completed, the facility places the results in the appropriate database and notifies system controller 128 that the work is completed.

System controller 128 exercises both general resource control and specific control over the work items by manipulating the work queues. For example, controller 128 may prohibit a facility from taking items from the facility's work queue, thereby freeing resources that would be used by that facility for use by other facilities.

Once a facility has work in the facility's work queue, operating system 208 examines its priorities to decide which facility's work to execute at any given moment. As the job progresses, controller 128 may modify the relative priorities of the facility's work. In the event controller 128 does this, controller 128 notifies resource controller 210 which then parcels out the needed resources accordingly.

In one example, scan section 100 places image data obtained from scanning in the database 131 and notifies the system controller 128 that scanning is completed. Controller 128 then places a print work item in the print facility's work queue, and the print facility (i.e., marker 130) generates the print output using the scanned in image data from database 131.

Capture service 30 and make ready service 114 are accessed directly through resident user access routines (Dialog) 24. PC 20 and host computer 22 access are not provided nor is selection of print and finishing services 34, 36 respectively. In this embodiment, document scanner 105 serves to capture the work while make ready section 114 supports the necessary pre-press and system xerographic operations.

The architecture is well suited for use as a network printing service that is accessed either remotely from host 22 or directly through resident user access routines 24.

Figure 1:
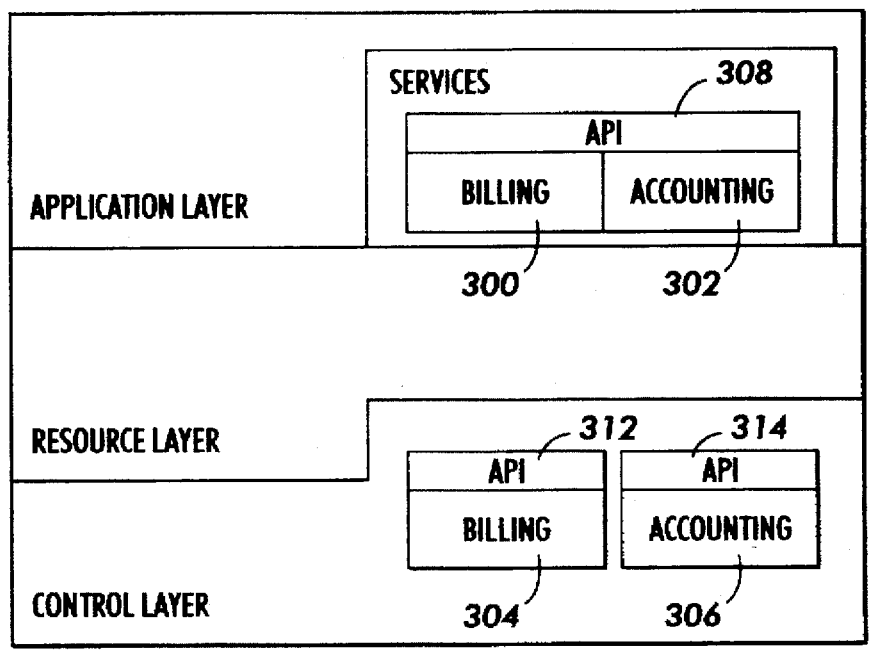
FIG. 1 is a schematic block diagram of a layered document services architecture including systems for providing billing and accounting services for a job upon which selected functions are performed.

Referring to FIG. 1, the architecture of FIGS. 6 and 7 is preferably provided with billing and accounting functionality. In the illustrated embodiment of FIG. 1, a billing input subsystem 300 and an accounting input subsystem 302 are provided in the Services System of the Application Layer 14 so that a user can communicate with the billing application 304 and the accounting application 306, both of which billing and accounting applications are preferably disposed in the Control Layer. In practice, a user communicates with the subsystems 300 and 302 by way of interface 308, the interface 308 comprising, in one example, a suitable application programming interface ("API"). It will be appreciated by those skilled in the art that while a single API is shown for access to the subsystems 300, 302, a dedicated API could be provided for each of the subsystems 300 and 302. Use of one API for subsystem 300 and another API for subsystem 302 provides certain advantageous results, e.g. with dedicated APIs, one of the two APIs can be deleted without deleting the other API. The user and various event generators communicate with the applications 304 and 306 by way of respective interfaces 312 and 314. As will appear, the billing and accounting applications process information received from the Application and Resource Layers.

Figure 2:
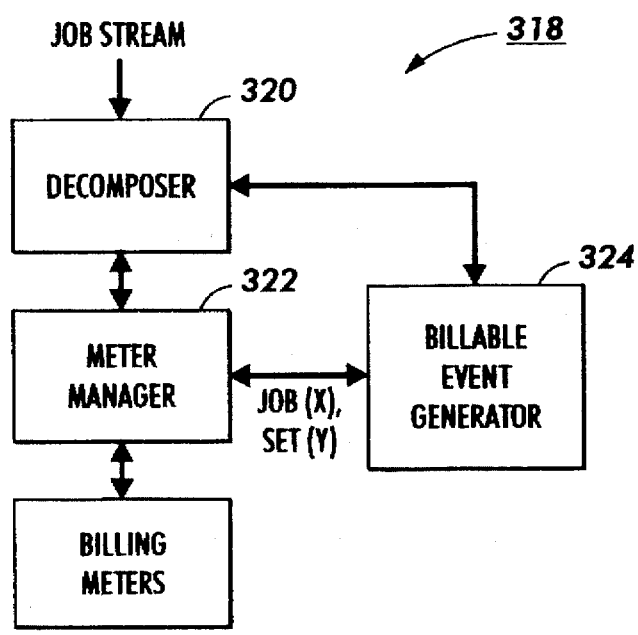
FIG. 2 is a block diagram of a billing arrangement which is believed to be employed in a conventional electronic reprographic system.

Referring to FIG. 2, a system for handling billing in an electronic reprographic system, which is believed to be conventional, is designated with the numeral 318. The bill handling system of FIG. 2 includes a decomposer 320 for placing the contents of a job stream into a printable form, referred to hereinafter as "print job". The decomposer, the details of which are discussed in the above-mentioned Bonk patent, performs various interpretative operations on the job of the incoming job stream and passes certain information about the job, e.g. a job identifier (Job(X)) and a job description, along to a meter manager 322. In practice, the decomposer directs the execution of the print job through one or more billable event generator, one of which generators is shown in FIG. 2 and designated with the numeral 324. The meter manager further communicates with a set of billing meters 326, which billing meters are believed to be hard-coded in conventional arrangements—the significance of such hard-coding is discussed in further detail below.

As in conventional billing arrangements, the billing meters are counters which serve to keep track of consumption by a user of consumables or services associated with the host electronic reprographic system. In one example, the billable event generator comprises a print subsystem for printing sets of the print job developed from the job stream of FIG. 2. As each set is printed, the billable event generator 324 transmits a signal to the meter manager 322 indicating a corresponding job identifier, namely Job(X) along with an indication, through Set(Y), that a job set has been completed. In turn, the counts of various meters are incremented by the meter manager 322 to indicate what consumables and/or services were provided as a result of printing the set. Since the meter manager is aware of composition of the print job, it knows what meters should be incremented to reflect the printing of a set. As is known, for any given page of the set, a plurality of meters may be incremented to accommodate for the provision of multiple consumables and/or services. Moreover, the counts of the meters are, in one approach (see U.S. Pat. No. 5,146,344), multiplied by appropriate rates to obtain a billable amount for a user.

The above-described billing system is well suited for its intended purpose; however, it is believed that certain improvements would serve to make such system more flexible and more network user "friendly". In particular, since the billing meters are hard-coded, it is not possible for a user to add or delete meters to accommodate for the use of unanticipated consumables or services. For example, to add a meter for a new special stock which is not reflected in the current set of meters, it is believed that extensive reconfiguration of the host machine code is required. That is, a new code set for the host machine is required and much of the host machine code must be recompiled. Additionally, the system of FIG. 2 requires use of the interpreter (decomposer) to apprise the meter manager of job descriptions without such job descriptions, the meter manager would not know which meters to increment since the billable event generator, taken alone, does not describe an event in great enough detail to permit the incrementing of individual meters.

Figure 3:
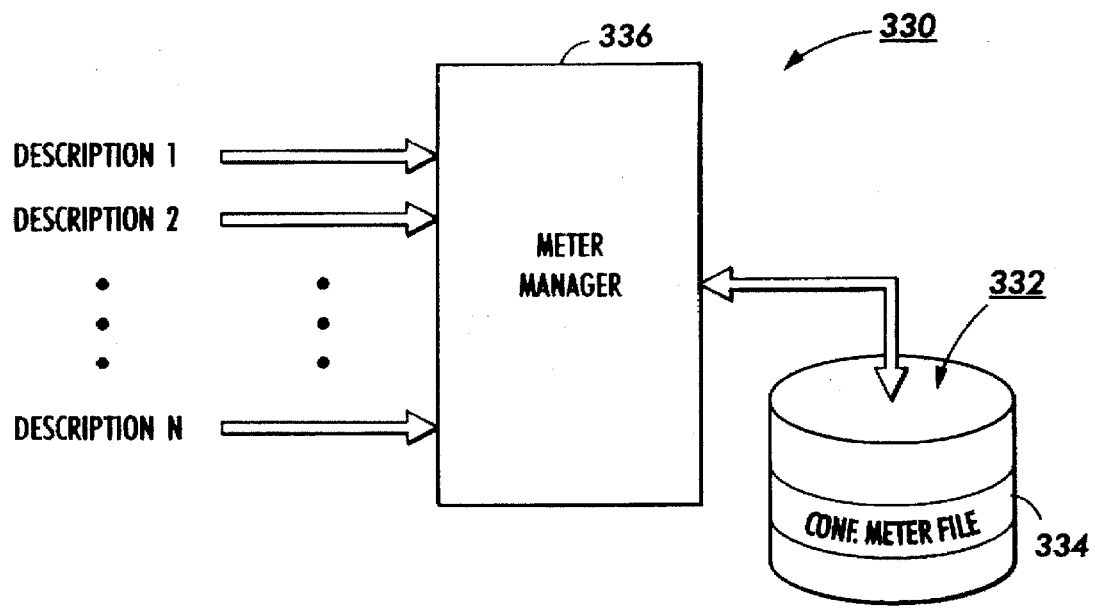
FIG. 3 is a block diagram of a billing system embodying, in part, the present invention.

The structure of a billing system that addresses the above-stated concerns is designated, in FIG. 3, with the numeral 330. It will be appreciated that much of the system 330 is implemented by way of billing application 304 (FIG. 1). The system 330 includes a block of mass memory 332 which includes a configurable meter file 334. Descriptions 1, 2, . . . N, as discussed in further detail below, are provided by, among other sources, various subsystems of the resource layer 16. As will appear from the discussion below, a request associated with each description is executed with a meter manager 336.

Figure 4:
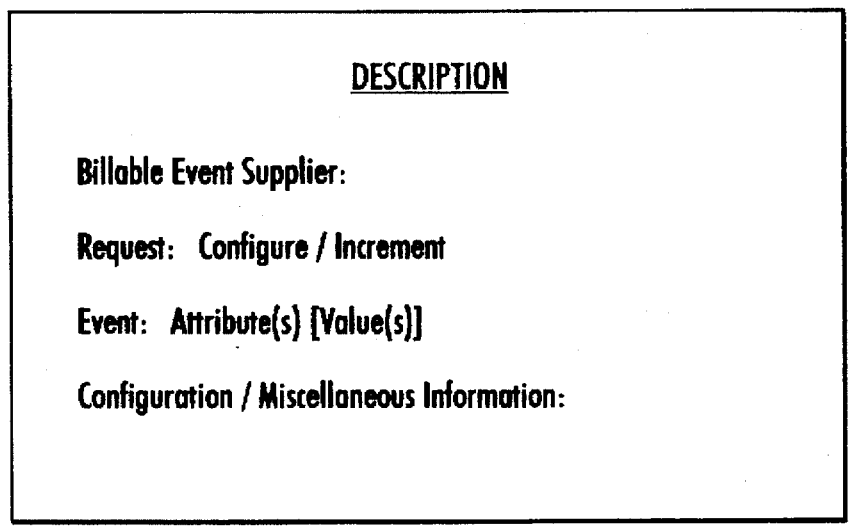
FIG. 4 is a schematic view of an electronic description used in conjunction with the billing system of FIGS. 1 and 3.

Referring to FIGS. 4 and 7, each time a selected subsystem performs a function relative to a given document, the manager or controller associated with the selected subsystem generates an electronic description of the function of the type shown in FIG. 4. In the electronic description, which for ease of discussion is shown as a printed sheet, the subsystem which is responsible for performing the function is referred to as the "billable event supplier". In practice, a billable event supplier provides information, referred to in FIG. 4 as a "request" so that the billing system is either configured, in accordance with the information provided by way of "event" and/or "miscellaneous info[rmation], or one or more meters are incremented to reflect a billable amount of consumables or services corresponding with the event information.

Figure 5:
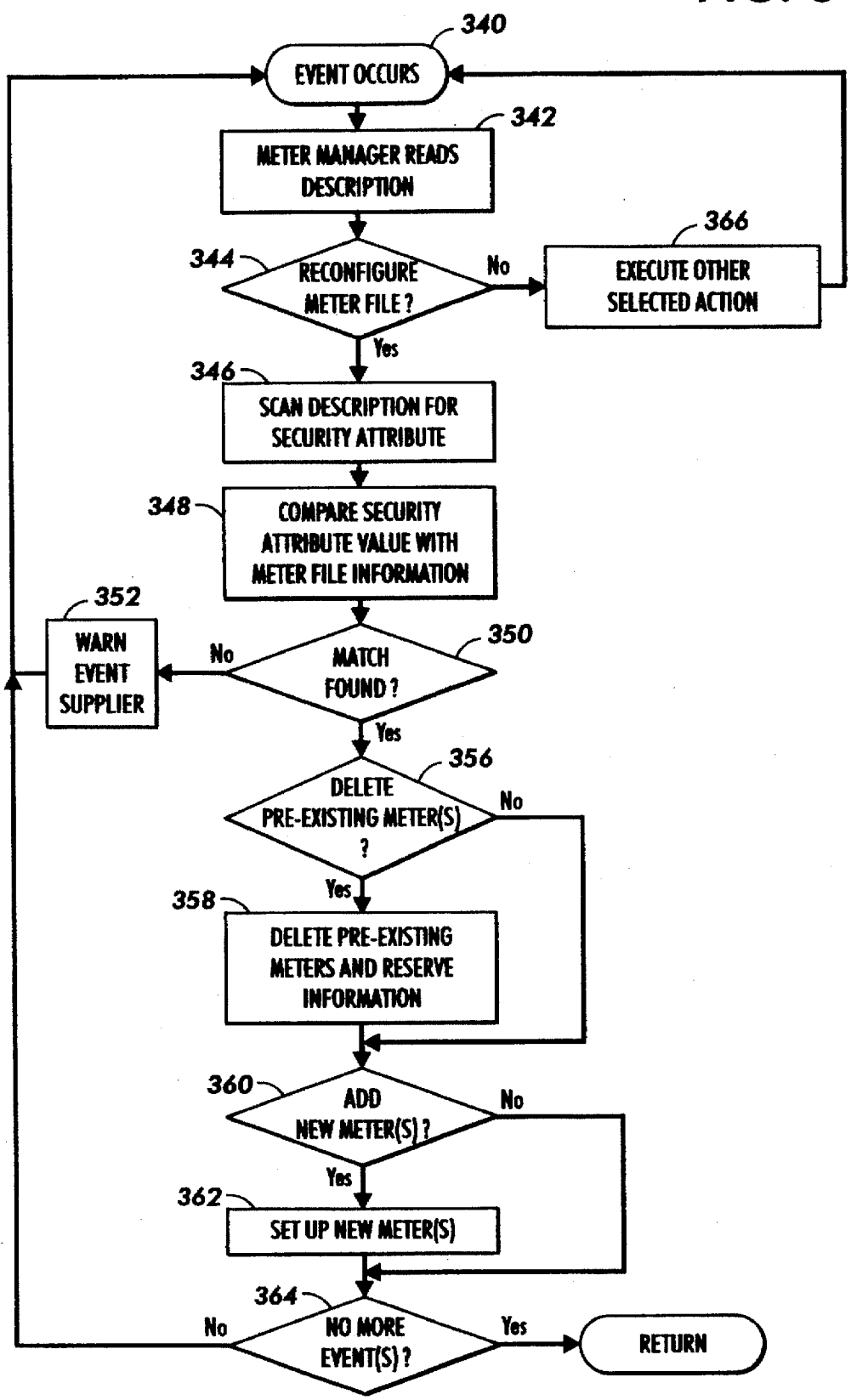
FIG. 5 is a flow diagram demonstrating a preferred mode of operation for the billing system of FIGS. 1 and 3.

Operation of the billing system 330 will be comprehended more fully by reference to FIG. 5. In a present exemplary mode of operation, a billing meter of configuration file 334 (FIG. 3) is configured and one or more billing meters are then incremented to reflect the amount consumables and/or services used as a result of a resource layer subsystem function. Initially, at step 340, an event occurs and a suitable description is provided by the subsystem responsible for generating the event. In the example of FIG. 5, it is assumed that the first event corresponds with a request to configure the configuration meter file 334— this request is enterable at the billing input subsystem 300 (FIG. 1) by way of the API 308.

The meter manager 336, at step 342, reads the description to determine, by way of step 344, whether the request is directed toward a configuration or increment command. Since the present exemplary explanation assumes that a configuration command is initially received, the meter manager reads or scans the description (step 346), requesting configuration, to ascertain whether an appropriate security indicator has been provided in the event field. It will be appreciated that the event information could be configured to vary as a function of a user's particular identidy. It is contemplated that an attribute might assume the form of a function, such as "Security(525)", to indicate a particular user seeks to add and/or delete a billing meter relative to the file 334. It will be appreciated that while the present disclosure addresses explicitly the problem of adding or deleting a billing meter, the disclosure contemplates the change of a billing meter, which change may, in one example, constitute no more than deleting a billing meter and replacing it with another billing meter.

Moreover, in one instance, information corresponding with the security function would embedded in the file 334 and the meter manager would, at step 348, make a comparison between the information associated with the indicator provided by the description and information stored in the file 334. For those circumstances in which a match is not found between the information of the security indicator and information embedded in the file 334 (i.e. step 350 is answered in the negative), the user is provided with a warning (step 352) and given another opportunity to provide a suitable description with the proper security indicator.

Assuming that a match is found, the process checks at steps 356 and 360 to determine if a meter is to be deleted from or added to the configurable meter file 334. Referring again to FIG. 4, configuration information information may be provided by way of a "Configuration/Miscellaneous Info[rmation]" field. Preexisting meters may be deleted by way of 358, but information associated with the deleted meter is saved for future billing calculation(s). New meters are set up by way of step 362. It should be recognized that a meter could be replaced by using a delete operation and an add operation conjunctively. At step 364, a check is made to determine if any more events have occurred which would require further configuring or incrementing. If no more events have occurred, then the process returns, otherwise, it loops back to step 340.

In the present example, the process returns to step 340 where it is determined that no further reconfiguring is required. It will be appreciated that in other examples, various configuration operations may be executed prior to performing any incrementing operations. The process then proceeds to step 366 where an action, consistent with the event and/or miscellaneous information read in step 342, is taken. Commonly, the action will comprise incrementing one or more meters to reflect a function performed on the selected document.

In one instance, the miscellaneous information may include system state information causing an adjustment in billable information. Such adjustment may be warranted as a result of a portion of the system associated with the document services architecture 10 being in a diagnostic state. In this case, alternative meters, which accommodate for the charging of a lower rate may be made available. In response to reading the state information in the miscellaneous information, the alternative meters would be incremented until another description indicating the end of the diagnostic state was read.

Numerous features of the above-described embodiment(s) will be appreciated by those skilled in the art:

First, the billing meter file of the above-described billing system is configurable rather than hard-coded. Accordingly, a user can make additions, deletions or changes, relative to the configurable billing meter file, with a minimum amount of manipulation of corresponding software.

Second, the above-described billing system corresponds with a distributed, rather than centralized, model. Accordingly, the billing system can respond to the needs of multiple clients across a local or wide area network.

Finally, the billing system described above can be made secure to avoid inappropriate changes to the configurable billing meter file. In one example, a user is required to provide a billing manager with a suitable security indicator before any additions, deletions or changes can be made to the configurable billing meter file.

Postcript is a Trademark of Adobe Corporation

Xerox and all Xerox Products referred to herein are Trademarks of Xerox Corporation UNIX is a Trademark of AT&T Bell Laboratories

What is claimed is:

1. In a printing system for processing a job with one or more events occurring, relative to the job, as a result of processing the job, a billing system for generating billing information by reference to the events, comprising:

a configurable billing information file including a plurality of current incrementable billing meters with each current incrementable billing meter corresponding with a set of one or more attribute values;

an information set including event related information with the event related information indicating that a new incrementable billing meter is to be added to the plurality of current incrementable billing meters or that one of the plurality of current incrementable billing meters is to be deleted; and a billing meter manager, responsive to said information set, for causing the new incrementable billing meter to be added to said configurable billing information file or for causing one of the plurality of current incrementable billing meters to be deleted from said configurable billing information file.

2. The billing system of claim 1, wherein said information set comprises an electronic description and said billing meter responds to the electronic description by reading the event related information included therein.

3. The billing system of claim 2, wherein said billing meter manager prohibits the adding of the new incrementable billing meter or the deleting of the one of the plurality of current incrementable billing meters until said billing meter manager detects that a security clearance indicator exists in the electronic description.

4. The billing system of claim 3, wherein said billing manager prohibits the adding of the new incrementable billing meter or the deleting of the one of the plurality of current incrementable billing meters until said billing meter manager detects that an attribute value corresponding with the security clearance indicator exists in said configurable billing information file.

5. The billing system of claim 4, wherein said billing meter manager prohibits the adding of the new incrementable billing meter or the deleting of the one of the plurality of current incrementable billing meters until said billing meter manager determines that a selected relationship exists between the security clearance indicator and the attribute value corresponding with the security clearance.

6. The billing system of claim 1, in which the printing system includes a plurality of event generating subsystems, wherein said information set is communicated to said billing meter manager from one of the plurality of event generating subsystems.

7. The billing system of claim 6, in which an unexpected event occurs at one of the plurality of event generating subsystems, wherein the event related information includes a direction to add a new incrementable billing meter to reflect the occurrence of the unexpected event.

8. The billing system of claim 6, in which a preexisting event generating subsystem is deleted from the plurality of event generating subsystems, wherein the event related information includes a direction to delete a preexisting incrementable billing meter to reflect the deletion of the preexisting event generating subsystem.

9. The billing system of claim 8, wherein information associated with the deleted billing meter is saved for future reference.

10. The billing system of claim 6, wherein said configurable billing information file and said billing meter manager are located in a server and one of said event generating subsystems communicates with said server by way of a network connection.

11. The billing system of claim 10, wherein said information set is prepared at one of said event generating subsystems and transmitted therefrom to said server to be acted on by said billing meter manager.

12. In a printing system for processing a job with one or more events occurring, relative to the job, as a result of processing the job, a method for generating billing information by reference to the events, comprising:

providing a plurality of current incrementable billing meters with each current incrementable billing meter being defined by at least one attribute;

transmitting event related information, indicating that one of the plurality of current incrementable billing meters is to be deleted or that a new incrementable billing meter is to be added to the plurality of current incrementable billing meters, to a billing meter manager; and using the billing meter manager, deleting the one of the plurality of current incrementable billing meters or adding the new incrementable billing meter to the plurality of current incrementable billing meters in response to said transmitting.

13. The method of claim 12, further comprising prohibiting said deleting or said adding unless the existence of a security clearance indicator is detected by the billing meter manager.

14. The method of claim 13, in which the billing meters reside in a configurable billing information file, further comprising prohibiting said deleting or said adding until the billing meter manager detects that an attribute value corresponding with the security clearance indicator exists in the configurable billing information file.

15. The method of claim 14, further comprising prohibiting said adding or said deleting until the billing meter manager determines that a selected relationship exists between the security clearance indicator and the attribute value corresponding with the security clearance indicator.

16. The method of claim 12, in which the event related information is part of an electronic description and the printing system includes a plurality of event generating subsystems, wherein said transmitting includes communicating the electronic description to the billing manager from one of the plurality of event generating subsystems.

17. The method of claim 16, in which an unexpected event occurs at one of the plurality of event generating subsystems, wherein said adding includes adding the new incrementable billing meter to accommodate for the unexpected event.

18. The method of claim 16, in which at least one of the plurality of event generating subsystems communicates with the billing manager across a network, wherein said transmitting includes transmitting the event related information across the network from the at least one of the plurality of event generating subsystems to the billing manager.

19. The method of claim 12, further comprising providing the event related information with a direction to delete one of the plurality of current incrementable billing meters.

20. The method of claim 19, in the one of the plurality of current incrementable billing meters is associated with billing information, further comprising saving the billing information for future reference.

* * * * *